UNITED STATES PATENT OFFICE.

AMOS WOEBER, OF CINCINNATI, OHIO, ASSIGNOR OF ONE-HALF TO HENRY VARWIG, OF SAME PLACE.

FULMINATE.

SPECIFICATION forming part of Letters Patent No. 269,769, dated December 26, 1882.

Application filed July 1, 1882. (Specimens.)

*To all whom it may concern:*

Be it known that I, AMOS WOEBER, a citizen of the United States, residing at Cincinnati, in the county of Hamilton and State of Ohio, have invented certain new and useful Improvements in Fulminates, of which the following is a specification.

The object of my invention is to provide a cheap and perfectly-secure fulminate for charging the explosive target balls or shells described in Letters Patent No. 225,621, granted to George Ligowsky and myself, March 16, 1880. The fulminate is composed of chlorate of potash, washed flour-sulphur, amorphous phosphorus, and a suitable cement, size, or other adhesive medium—such as gum-tragacanth—the manner of preparing and applying these ingredients being as follows: I first pour six fluid ounces of dissolved gum-tragacanth into a stone or earthenware mortar or similar vessel, and add thereto one pound of chlorate of potash, these two ingredients being then thoroughly ground together with a pestle or otherwise, so as to pulverize them as fine as flour, and yet leave the mass in the condition of a paste. I then pour six fluid ounces of the same gum into another mortar, and mix with said gum one-half pound of washed flour-sulphur and reduce them by a similar grinding operation to the consistence of paste. These two pasty compounds are now mixed together, and preferably in a third mortar or vessel, care being taken to keep this mixture constantly moist or wet. The next proceeding consists in grinding two ounces of amorphous phosphorus in a fourth mortar or vessel, this phosphorus being ground very slowly and under water, so as to avoid any generation of heat. As soon as the phosphorus has thus been pulverized it is poured into and mixed with the contents of the third mortar, and kept constantly wet. Owing to the density of the complete compound, it soon settles to the bottom of the mortar, leaving the water on top, thus preserving the mixture from the atmosphere and preventing the latter acting on the phosphorus.

The above-described operations complete the preparation of the fulminate, which is then applied to the target balls or shells in the following manner: The greater quantity of the water is poured off, leaving only enough to reduce the compound to the consistence of ordinary paste, the mass being constantly stirred with a wooden paddle or spoon while being applied to the balls or shells. This application is effected with a soft brush, or other implement that will not ignite the fulminate by subjecting it to any very severe friction. As soon as the fulminate is dry the balls are ready for use in the manner described in the patent previously alluded to, the peculiar ingredients used in the compound causing the exploded targets or shells to emit a very dense cloud of smoke, accompanied with only a slight flash and faint report. This fulminate is not only very cheap and easily manufactured, but is perfectly safe in any and every condition where it can be used, as the washed flour-sulphur frees the compound from any acid that might have a tendency to produce spontaneous combustion. Furthermore, when packed in a box or crate the accidental explosion of one shell will not start another, neither will such an explosion set fire to the shavings, straw, or sawdust surrounding the balls. Consequently balls or shells coated with this fulminate are transported with the utmost safety, and without being rated as extra hazardous articles. The balls can be kept for an indefinite period of time without causing the fulminate to deteriorate, and in case a shell should absorb moisture until it becomes quite wet, yet the fulminate will be as good as new the moment the ball is dried, so as to expel the moisture therefrom.

Pulverized antimony or charcoal may be added to increase the bulk of the compound; but as either of these ingredients would render the fulminate quite dangerous their use is discouraged.

While I have described this fulminate as being composed of one pound of chlorate of potash, one-half pound of washed flour-sulphur, two ounces of amorphous phosphorus, and twelve ounces of gum-tragacanth, yet these proportions are not arbitrary, but can be modified according to the strength of the various ingredients. Again, although gum-tragacanth is preferred, the same results may be obtained by mixing the ingredients with starch or size or any mucilaginous medium that will cause the fulminate to adhere to the shells or balls.

I am aware it is not new to use chlorate of potash, amorphous phosphorus, and ordinary flour-sulphur in preparing fulminate and similar explosives; but I know of no instance where washed flour-sulphur has been employed for such purposes. Consequently my claim is limited to the combination of washed flour-sulphur with the ingredients herein named, ordinary flour-sulphur being expressly disclaimed for the reason stated in this specification.

I claim as my invention—

A fulminate composed of chlorate of potash, amorphous phosphorus, washed flour-sulphur, and gum-tragacanth, or their described equivalents, substantially in the proportions herein described and set forth.

In testimony whereof I affix my signature in presence of two witnesses.

AMOS WOEBER.

Witnesses:
 JAMES H. LAYMAN,
 SAML. S. CARPENTER.